United States Patent
Sakurai et al.

(10) Patent No.: US 11,016,486 B2
(45) Date of Patent: May 25, 2021

(54) AUTONOMOUS MOBILE ROBOT

(71) Applicant: FUJI XEROX CO., LTD., Tokyo (JP)

(72) Inventors: Yasuharu Sakurai, Kanagawa (JP);
Hirokazu Tsubota, Kanagawa (JP);
Kunitoshi Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/690,697

(22) Filed: Aug. 30, 2017

(65) Prior Publication Data
US 2018/0196430 A1 Jul. 12, 2018

(30) Foreign Application Priority Data

Jan. 6, 2017 (JP) .............................. JP2017-001134

(51) Int. Cl.
| | |
|---|---|
| *G05D 1/00* | (2006.01) |
| *B25J 13/08* | (2006.01) |
| *B25J 19/04* | (2006.01) |
| *B25J 5/00* | (2006.01) |
| *G05D 1/02* | (2020.01) |
| *G06K 9/00* | (2006.01) |

(52) U.S. Cl.
CPC ......... *G05D 1/0088* (2013.01); *G05D 1/0212* (2013.01); *G05D 1/0223* (2013.01); *G05D 1/0246* (2013.01); *G06K 9/00228* (2013.01); *G06K 9/00302* (2013.01); *G05D 2201/0211* (2013.01)

(58) Field of Classification Search
None
See application file for complete search history.

(56) References Cited

U.S. PATENT DOCUMENTS

| | | | | |
|---|---|---|---|---|
| 9,110,469 | B2* | 8/2015 | Yamamoto | ........... G05D 1/0016 |
| 9,717,387 | B1* | 8/2017 | Szatmary | ................ A47L 9/009 |
| 9,992,632 | B2* | 6/2018 | Fujimoto | .............. H04W 4/023 |
| 2013/0035790 | A1* | 2/2013 | Olivier, III | ........... G05D 1/0246 |
| | | | | 700/246 |
| 2017/0166299 | A1* | 6/2017 | Fujimura | ................ G05D 1/101 |
| 2018/0173242 | A1* | 6/2018 | Lalonde | ............... G05D 1/0274 |
| 2018/0246525 | A1* | 8/2018 | Hiramatsu | ........... G05D 1/0246 |

FOREIGN PATENT DOCUMENTS

| | | |
|---|---|---|
| JP | 2004-209562 A | 7/2004 |
| WO | 2016/170808 A1 | 10/2016 |

OTHER PUBLICATIONS

Dec. 8, 2020 Office Action issued in Japanese Patent Application No. 2017-001134.

\* cited by examiner

*Primary Examiner* — Adam D Tissot
*Assistant Examiner* — Laura E Linhardt
(74) *Attorney, Agent, or Firm* — Oliff PLC

(57) ABSTRACT

An autonomous mobile robot includes a robot body, a movement unit, a detector, and a controller. The movement unit moves the robot body to a destination point. The detector detects a state of a person present around the destination point. The controller controls the movement unit so as to make the autonomous mobile robot approach the person present around the destination point along a travel route that differs depending on the state of the person detected by the detector.

10 Claims, 16 Drawing Sheets

AUTONOMOUS MOBILE ROBOT

CROSS-REFERENCE TO RELATED APPLICATIONS

This application is based on and claims priority under 35 USC 119 from Japanese Patent Application No. 2017-001134 filed Jan. 6, 2017.

BACKGROUND

Technical Field

The present invention relates to an autonomous mobile robot.

SUMMARY

According to an aspect of the invention, there is provided an autonomous mobile robot including a robot body, a movement unit, a detector, and a controller. The movement unit moves the robot body to a destination point. The detector detects a state of a person present around the destination point. The controller controls the movement unit so as to make the autonomous mobile robot approach the person present around the destination point along a travel route that differs depending on the state of the person detected by the detector.

BRIEF DESCRIPTION OF THE DRAWINGS

An exemplary embodiment of the present invention will be described in detail based on the following figures, wherein.

DETAILED DESCRIPTION

Now, an exemplary embodiment of the present invention will be described in detail with reference to the drawings. In this exemplary embodiment, a mobile image forming apparatus is used as an example of the autonomous mobile robot, and description is given.

Figure 1:
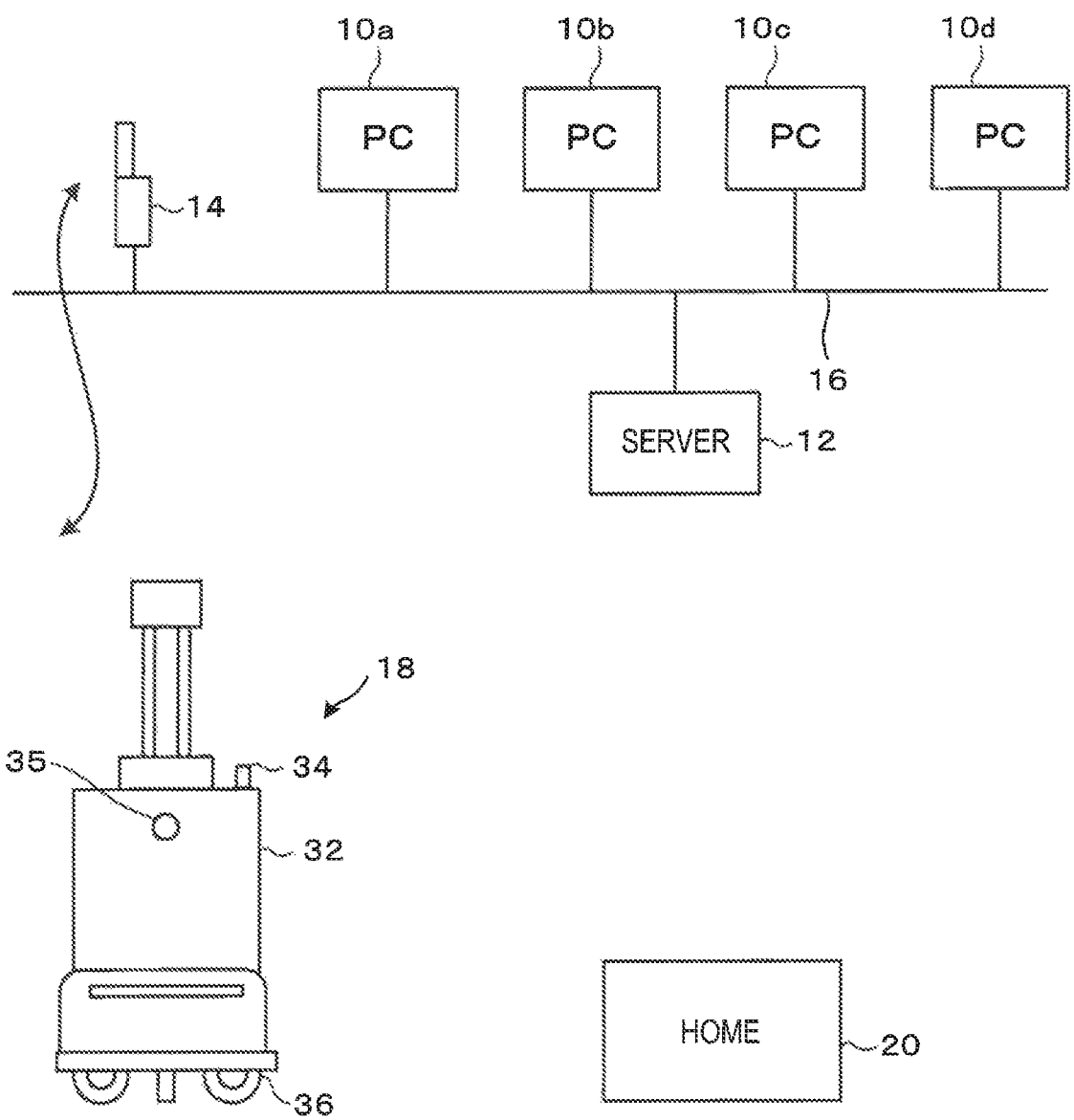
FIG. 1 is a diagram illustrating a system configuration of an image forming system according to an exemplary embodiment of the present invention.

FIG. 1 is a diagram illustrating a configuration of an image forming system 1 that uses a mobile image forming apparatus according to an exemplary embodiment of the present invention.

In the image forming system 1 according to the exemplary embodiment of the present invention, four personal computers (PCs) 10a to 10d, a server 12, and a wireless local area network (LAN) terminal 14 are connected to one another over a network 16, for example. An image forming apparatus 18, which is the autonomous mobile robot, is configured to transmit/receive print data and so on to/from the wireless LAN terminal 14. The image forming system 1 has a home position 20 at which a commercial power supply and a solar photovoltaic power generation function are provided, and the image forming apparatus 18 is configured to be put on standby at the home position 20.

Each of the PCs 10a to 10d is configured to transmit print data created by a user thereof to the server 12.

Figure 2:
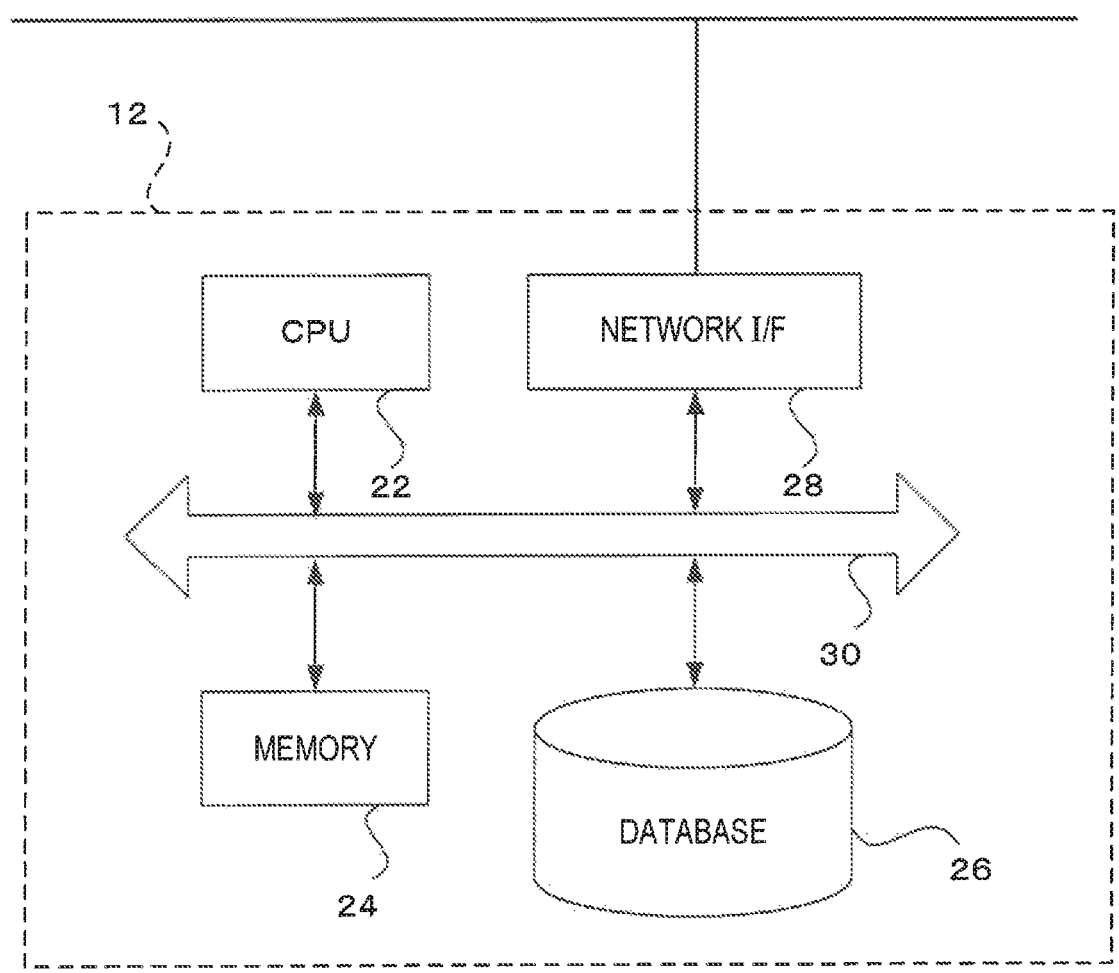
FIG. 2 is a block diagram illustrating a hardware configuration of a server according to an exemplary embodiment of the present invention.

FIG. 2 is a block diagram illustrating a hardware configuration of the server 12.

The server 12 includes a central processing unit (CPU) 22, a memory 24, a database 26, and a network interface 28, which are connected to one another via a control bus 30, as illustrated in FIG. 2.

The CPU 22 performs a predetermined process in accordance with a control program stored in the memory 24 to control the operations of the server 12.

The memory 24 stores the control program and print data described below.

The database 26 stores a map of an installation site, such as an office, in which the PCs 10a to 10d are installed and installation positions at which the PCs 10a to 10d are installed.

In this exemplary embodiment, the server 12 is connected to the PCs 10a to 10d over the network 16 that is a wired network; however, the server 12 may be connected to the PCs 10a to 10d over a wireless LAN. Alternatively, the server 12 may be implemented as a cloud server and connected to the PCs 10a to 10d over the Internet.

The image forming apparatus 18 is a self-propelled apparatus and includes a body 32, which is a robot body, a wireless communication unit 34, a sensor 35, which is a detector, and a movement device 36, which is a movement unit, as illustrated in FIG. 1.

The body 32 is a unit that performs image forming and prints print data received via the wireless communication unit 34 on paper.

The sensor 35 detects the condition of the surroundings as well as an obstacle and a person present on a route. Further, the sensor 35 detects the state of a person present around a destination point. As the sensor 35, a camera, an infrared sensor, or an ultrasonic sensor, for example, is used.

The movement device 36 moves the body 32 to a destination point in response to a movement instruction given from the server 12. As the movement device 36, wheels or legs, for example, are used. To the wheels or legs, a driving source, such as a motor, an actuator, an engine, or a hydraulic pump, for example, is connected.

Figure 3:
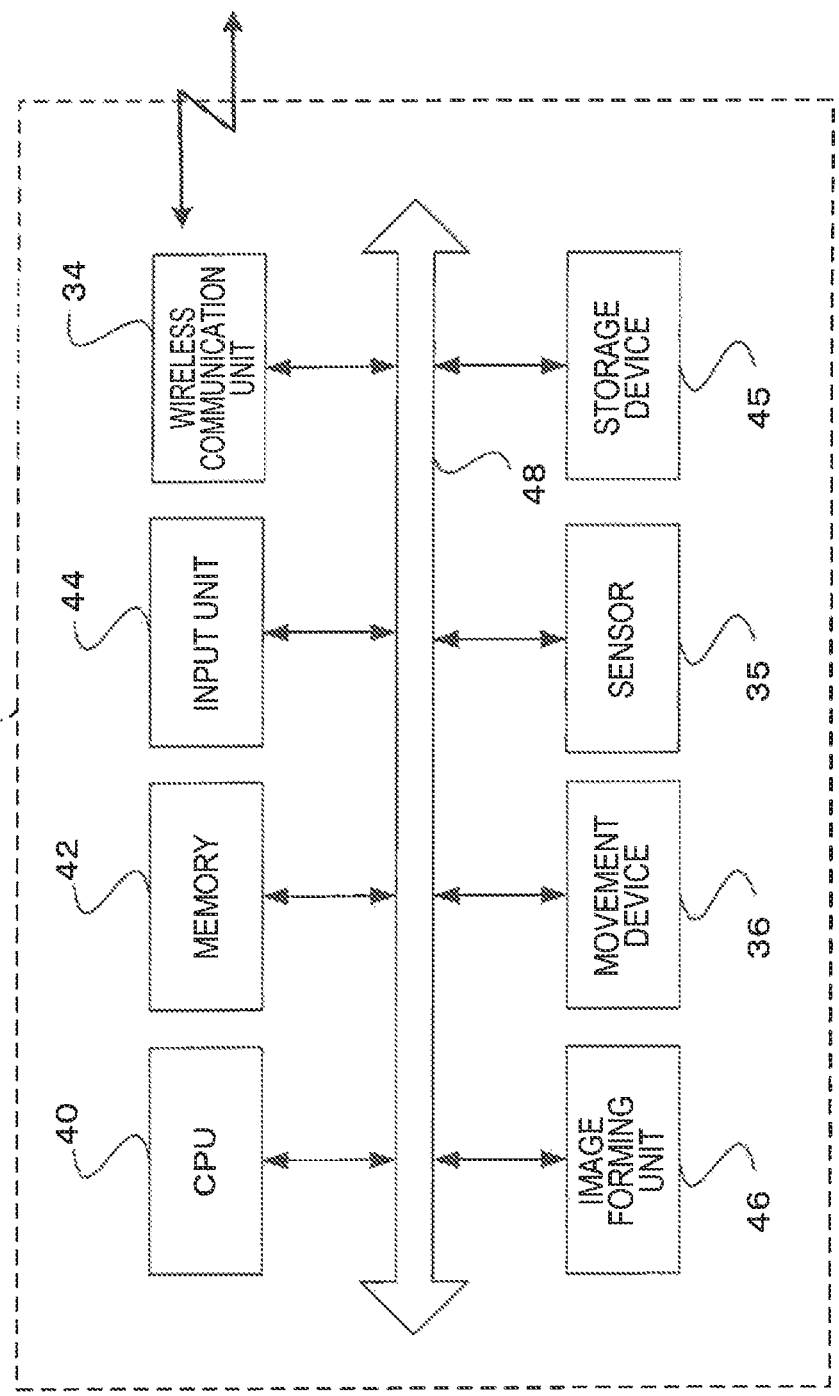
FIG. 3 is a block diagram illustrating a hardware configuration of an image forming apparatus according to an exemplary embodiment of the present invention.

FIG. 3 is a block diagram illustrating a hardware configuration of the image forming apparatus 18.

The image forming apparatus 18 includes a CPU 40, which is a controller, a memory 42, an input unit 44, a storage device 45, the wireless communication unit 34, an image forming unit 46, the movement device 36, and the sensor 35, which are connected to one another via a control bus 48, as illustrated in FIG. 3.

The CPU 40 performs a predetermined process in accordance with a control program stored in the memory 42.

The input unit 44 receives input information, such as a user ID and a user password. The input unit 44 includes an ID input unit into which a user ID is input from an IC card, for example.

The wireless communication unit 34 transmits/receives data to/from the wireless LAN terminal 14 via a radio link.

The storage device 45 stores the control program for controlling each unit of the image forming apparatus 18 and further stores a map of an installation site, such as an office, in which the PCs 10a to 10d are installed and installation positions at which the PCs 10a to 10d are installed.

The image forming unit 46 is a unit that performs image forming and prints print data received via the wireless communication unit 34 on paper.

The movement device 36 is configured to be controlled, in response to a movement instruction from the server 12 described above received by the CPU 40 via the wireless communication unit 34, in accordance with the movement instruction.

The sensor 35 detects the current position of the image forming apparatus 18. The sensor 35 detects the condition of the surroundings as well as an obstacle and a person present on a route. Further, the sensor 35 detects the state of a person present around a destination point.

The CPU 40 controls the movement device 36 so as to make the image forming apparatus 18 approach the person present around the destination point along a travel route that differs depending on the state of the person present around the destination point detected by the sensor 35.

Figure 4:
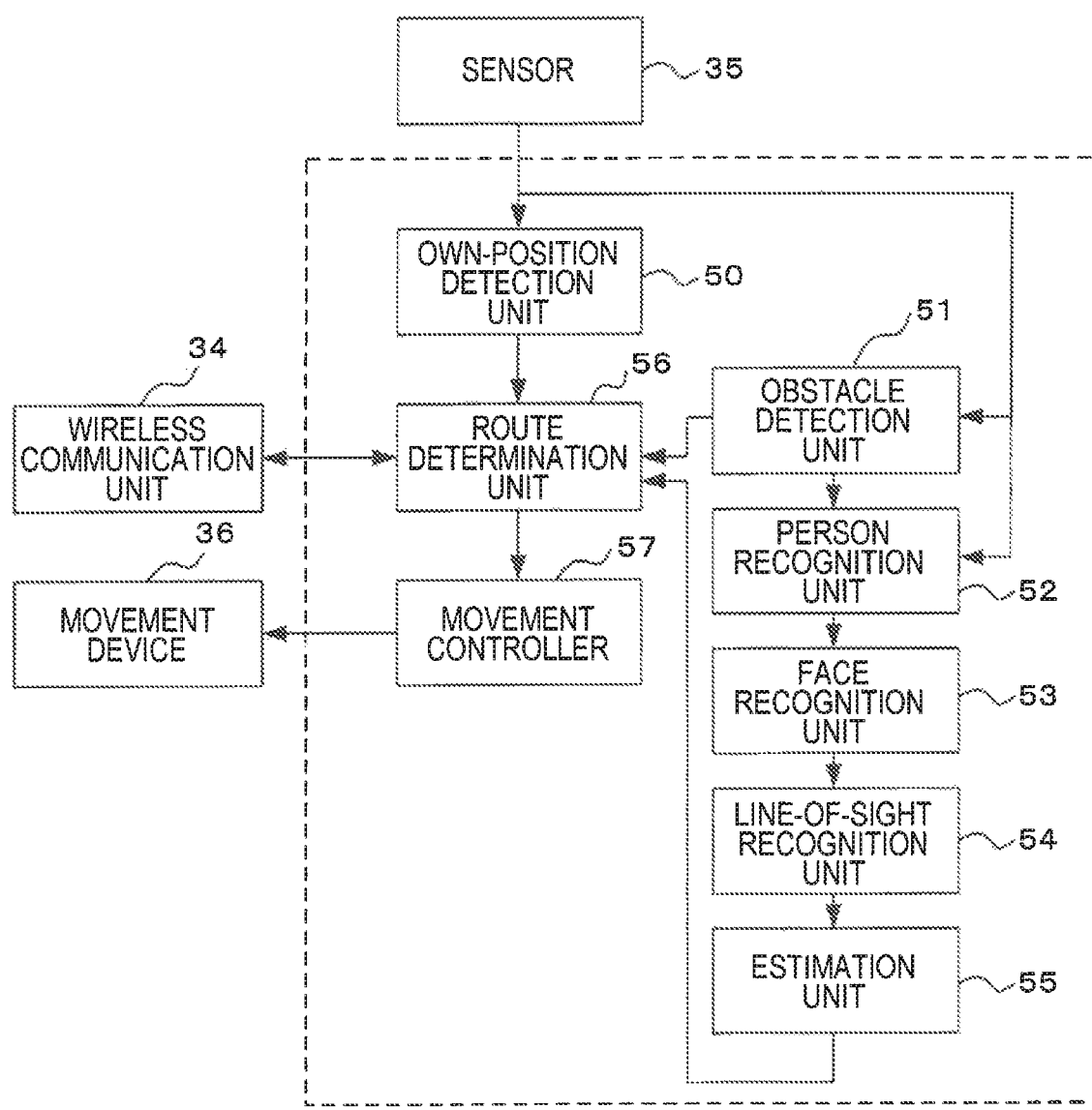
FIG. 4 is a block diagram illustrating a functional configuration of the image forming apparatus according to an exemplary embodiment of the present invention.

FIG. 4 is a block diagram illustrating a functional configuration of the image forming apparatus 18 that is implemented when a program is executed.

In the image forming apparatus 18, the wireless communication unit 34 transmits and receives data and the CPU 40 executes the control program stored in the storage device 45. Accordingly, the image forming apparatus 18 functions as an own-position detection unit 50, an obstacle detection unit 51, a person recognition unit 52, a face recognition unit 53, a line-of-sight recognition unit 54, an estimation unit 55, a route determination unit 56, and a movement controller 57, and controls the movement device 36, as illustrated in FIG. 4.

The own-position detection unit 50 obtains information about the current position of the image forming apparatus 18 detected by the sensor 35. Specifically, an object recognition process is performed by using an image obtained from a camera, or information about the distances to obstacles obtained from an infrared laser is analyzed in three dimensions, thereby creating a map of the surrounding obstacles and detecting the position of the image forming apparatus 18.

The obstacle detection unit 51 obtains information about the surroundings up to a destination point from the sensor 35 to detect an obstacle.

The person recognition unit 52 recognizes a person present around the destination point by using the sensor 35.

The face recognition unit 53 recognizes the face of the person recognized by the person recognition unit 52.

The line-of-sight recognition unit 54 recognizes the line of sight of the eyes of the face recognized by the face recognition unit 53.

The estimation unit 55 estimates the visual field of the person from the line of sight recognized by the line-of-sight recognition unit 54. Here, the visual field is a visible field, and it is commonly known that the human monocular visual field extends approximately 60 degrees upward, approximately 70 degrees downward, and approximately 90 to 100 degrees laterally. The field visible by simultaneously using both eyes extends to approximately 120 degrees.

Further, the estimation unit 55 infers the state of the person present around the destination point on the basis of information obtained by the person recognition unit 52, the face recognition unit 53, the line-of-sight recognition unit 54, and so on and information about an obstacle detected by the obstacle detection unit 51.

Specifically, the estimation unit 55 extracts the person present around the destination point from an image obtained by the sensor 35 and infers the state of the person present around the destination point. That is, on the basis of information about the contours, the face, the line of sight, and so on of the person recognized by the person recognition unit 52, the face recognition unit 53, and the line-of-sight recognition unit 54, it is possible to infer what the person is doing. Specifically, it is possible to obtain information about the person, that is, whether the person is standing or sitting, in which direction the person is facing, whether the person is looking down and working, or whether the person is talking face-to-face, for example. If plural persons are present, it is possible to infer on which side of the destination point each of the persons is present, how the persons are located, whether the persons are facing each other, whether the persons are located side-by-side, or whether the persons are facing in different directions.

The estimation unit 55 recognizes an obstacle and a person from an image obtained by the sensor 35 detecting the state of the surroundings and recognizes the locations of the obstacle and person present around the destination point. The estimation unit 55 infers what the person is doing from the contours of the person.

The route determination unit 56 determines a travel route to be taken on the basis of a travel route received from the server 12 and information obtained from the sensor 35. Specifically, the route determination unit 56 determines a travel route up to the destination point on the basis of information about the current position of the image forming apparatus 18 detected by the own-position detection unit 50, information about an obstacle detected by the obstacle detection unit 51, the state of the person present around the destination point recognized by the person recognition unit 52, the face recognition unit 53, and the line-of-sight recognition unit 54 and inferred by the estimation unit 55, and travel route information, a map of an office 58 (see FIG. 5), and information about the installation position of, for example, the PC 10a received from the server 12.

The movement controller 57 performs control for movement along the travel route determined by the route determination unit 56. Specifically, the movement controller 57 controls the route and speed for approaching in accordance with the state of the person present around the destination point. The movement controller 57 controls the route and speed for approaching in accordance with whether the person present around the destination point is looking at the image forming apparatus 18, which is detected by the line-of-sight recognition unit 54.

Figure 5:
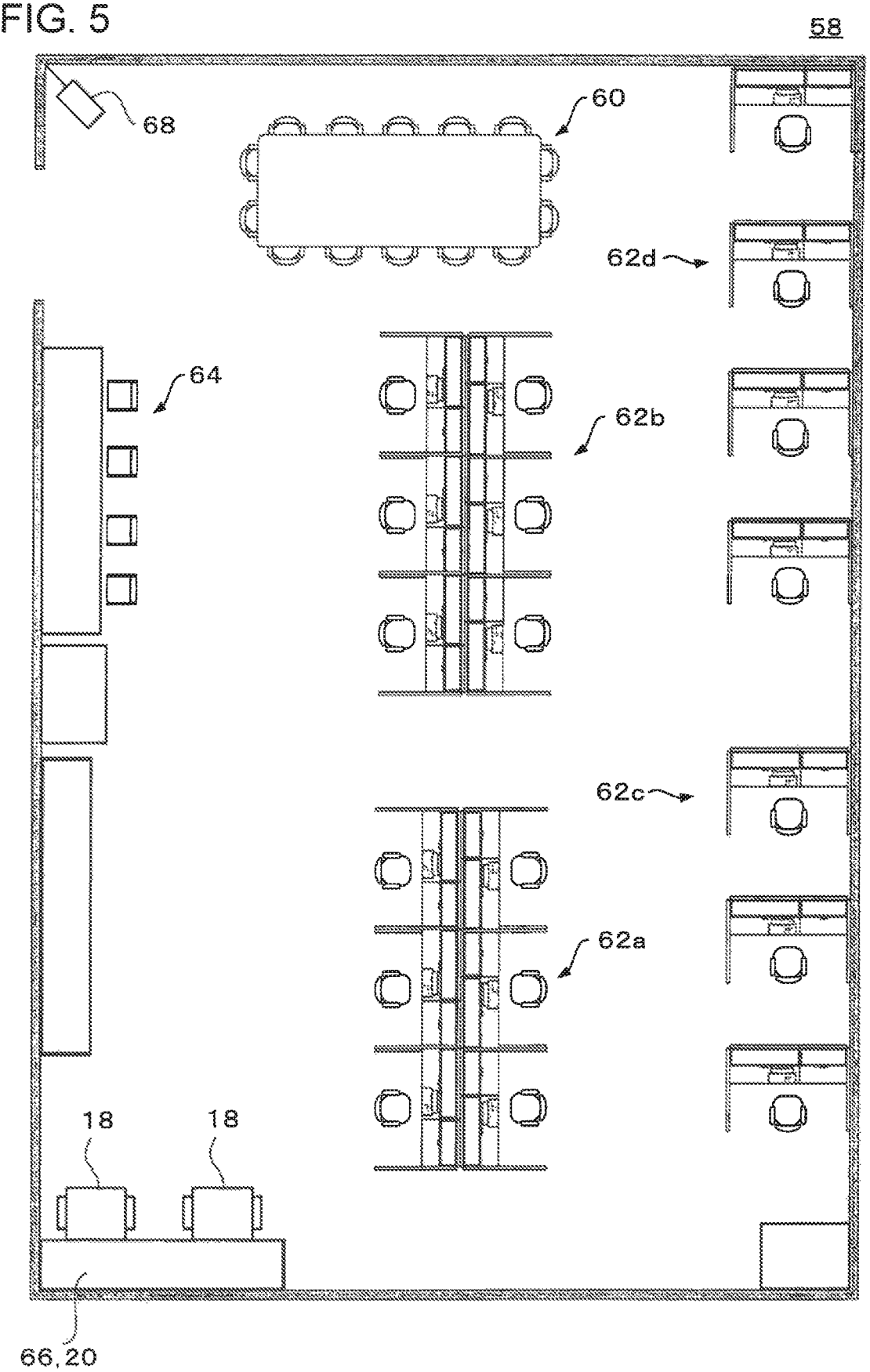
FIG. 5 is a plan view of an office applied to an exemplary embodiment of the present invention.

FIG. 5 is a plan view of the office 58 in which the image forming apparatuses 18 are installed.

The office 58 is separated into plural areas, that is, a meeting area 60, work areas 62a to 62d, and a reception area 64, for example. In each of the areas 60 to 64, a number of PCs 10 are provided. In the office 58, a depository 66 in which items, such as paper, toners, and so on, are stored is installed. The paper and so on stored in the depository 66 may be loaded into plural image forming apparatuses 18, that is, two image forming apparatuses 18, for example. The installation position of the depository 66 may be set as the home position 20 of the image forming apparatuses 18. Further, a surveillance camera 68 is installed in the office 58.

Figure 6:
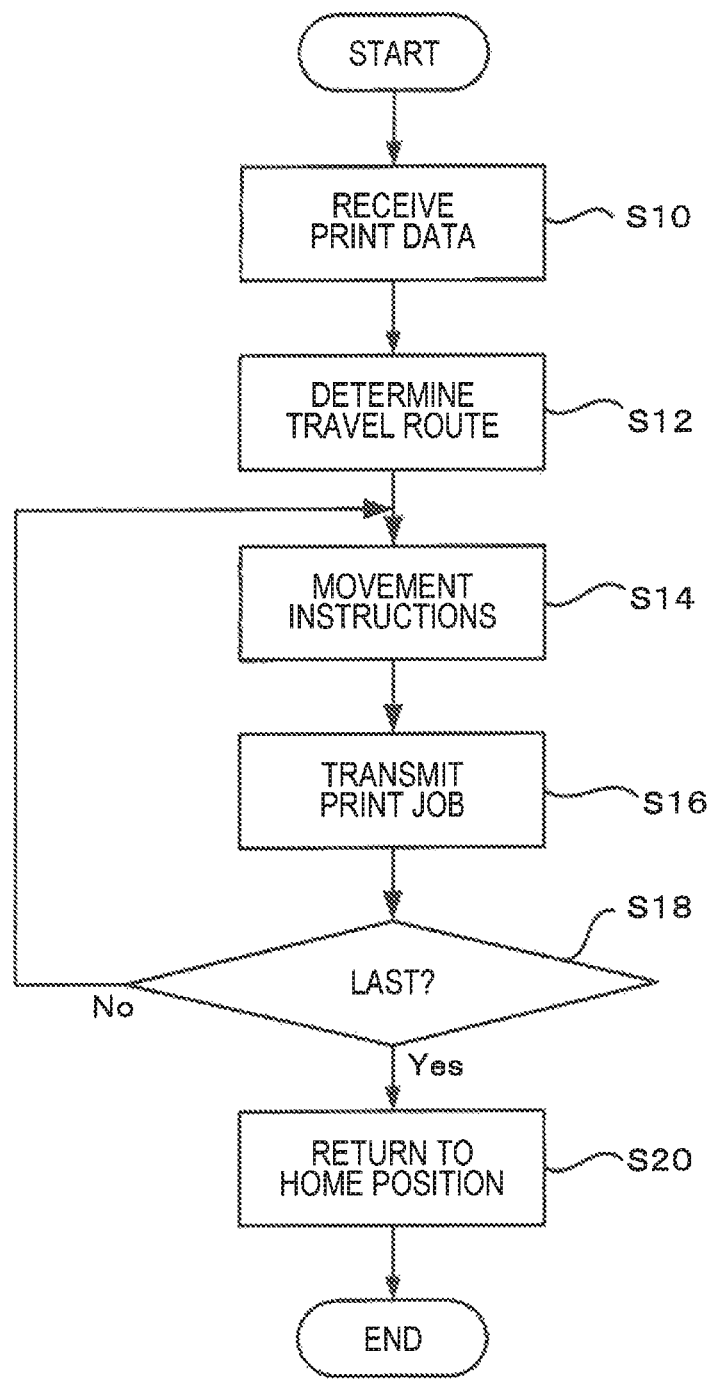
FIG. 6 is a flowchart illustrating a control flow of the server according to an exemplary embodiment of the present invention.
Figure 7:
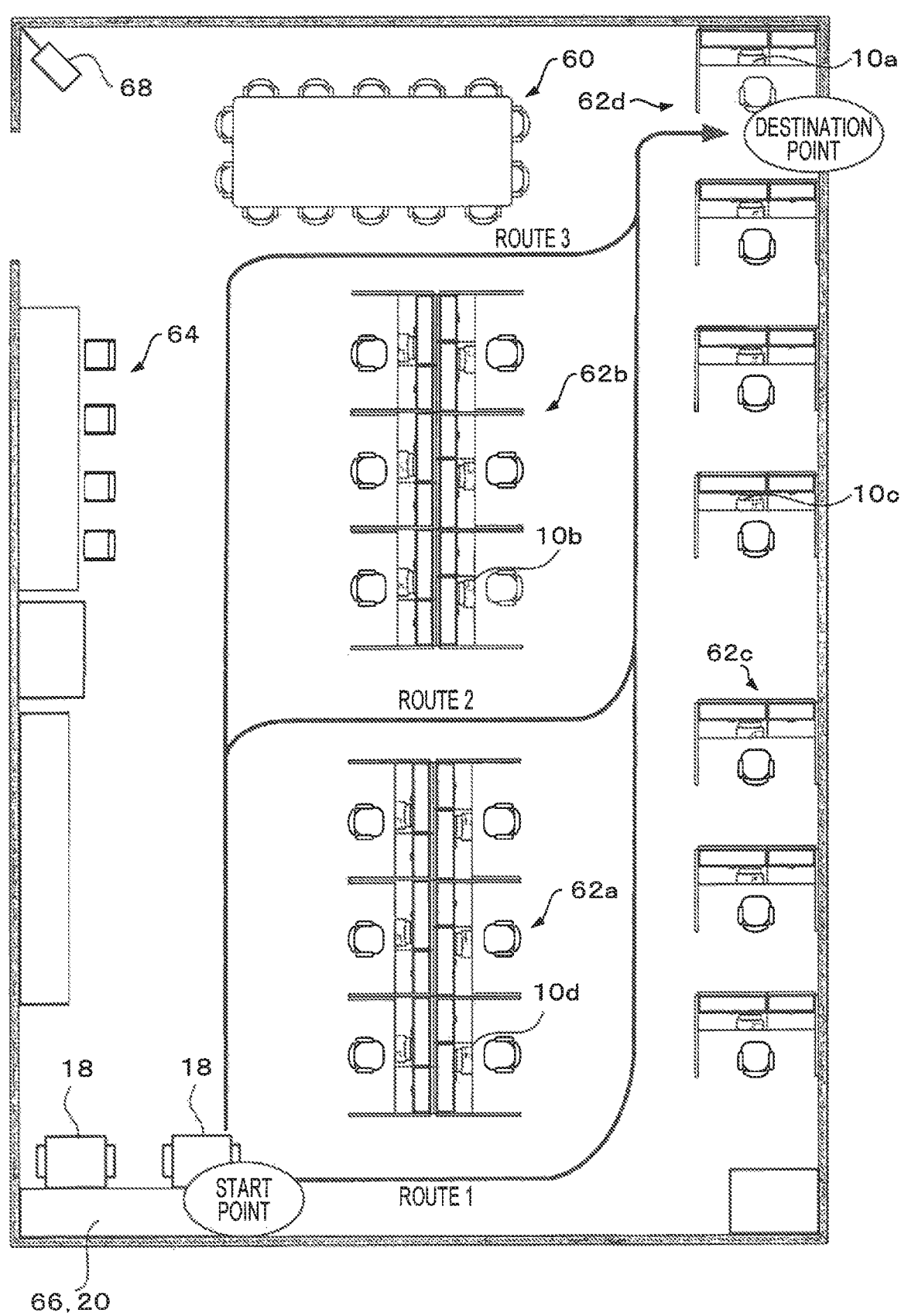
FIG. 7 is a diagram for describing a route search applied to an exemplary embodiment of the present invention.

FIG. 6 is a flowchart illustrating a control flow of the server 12. FIG. 7 is a diagram for describing a route search for the image forming apparatus 18 to move from the home position 20, which is the start point, to the desk of the user of the PC 10a, which is the destination point, in the office 58.

First, in step S10, the server 12 receives print data from, for example, one of the plural PCs 10a to 10d. The print data includes a print job, the user ID of the user of the one of the PCs 10a to 10d, and information about print settings (color or monochrome, the type and size of paper, double-sided or single-sided, image quality of printing, multiple-page printing (for example, 2 in 1), the type of post-processing, and so on). In a case where there are plural pieces of print data, the print jobs are put into a print job queue and stored in the memory 24 in the order in which the print jobs are received.

Next, in step S12, the server 12 identifies as a destination point the one of the PCs 10a to 10d that has transmitted the print job on the basis of the user ID of the user of the one of the PCs 10a to 10d. Then, the server 12 searches for travel routes from the start point at which the image forming apparatus 18 is located to the destination point on the basis of a map of the office 58 and information about the installation positions of the PCs 10a to 10d stored in the database 26, and selects a route that has the lightest traffic and the shortest length on the basis of accumulated data as the travel route. Specifically, routes 1 to 3 as illustrated in FIG. 7 are found, and the route 2 having the lightest traffic and the shortest length is selected as the travel route, for example.

Subsequently, in step S14, the server 12 outputs to the image forming apparatus 18 movement instructions one after another for instructing the image forming apparatus 18 to move along the selected travel route 2.

Subsequently, in step S16, the server 12 transmits the print job to be printed at the corresponding location to the image forming apparatus 18.

In a case where output of the transmitted print job is completed, the server 12 determines whether the print job is the last one in step S18. If the print job is not the last one (No in step S18), the flow returns to step S14, and the server 12 outputs movement instructions one after another for instructing the image forming apparatus 18 to move from the current position, which is the start point, to a location (destination point) at which the next print job is to be printed. In step S18, if it is determined that the print job is the last one (Yes in step S18), the flow proceeds to step S20, the server 12 instructs the image forming apparatus 18 to return to the home position 20, and the process ends.

Figure 8:
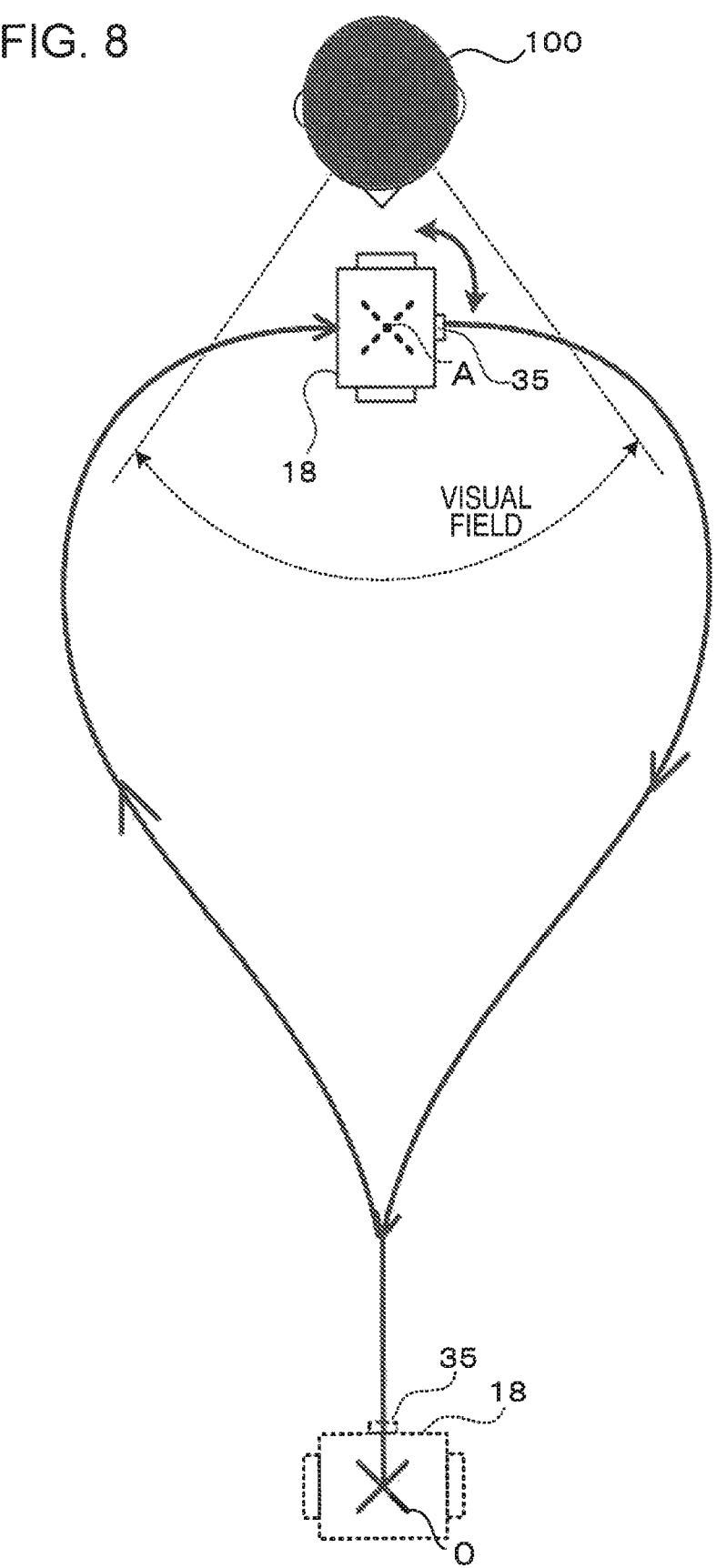
FIG. 8 is a diagram illustrating an example operation of the image forming apparatus according to an exemplary embodiment of the present invention.
Figure 9:
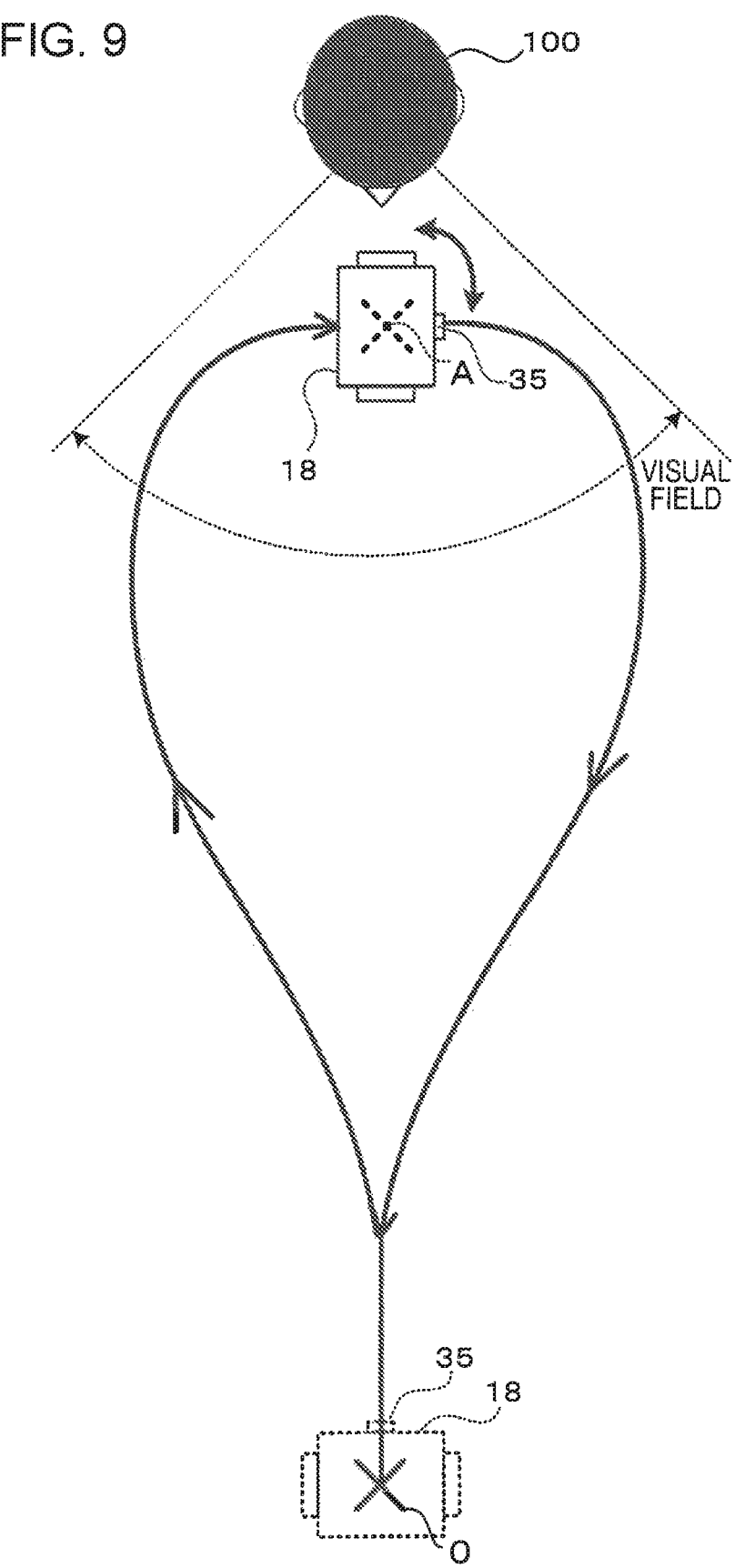
FIG. 9 is a diagram illustrating an example operation of the image forming apparatus according to an exemplary embodiment of the present invention.
Figure 10:
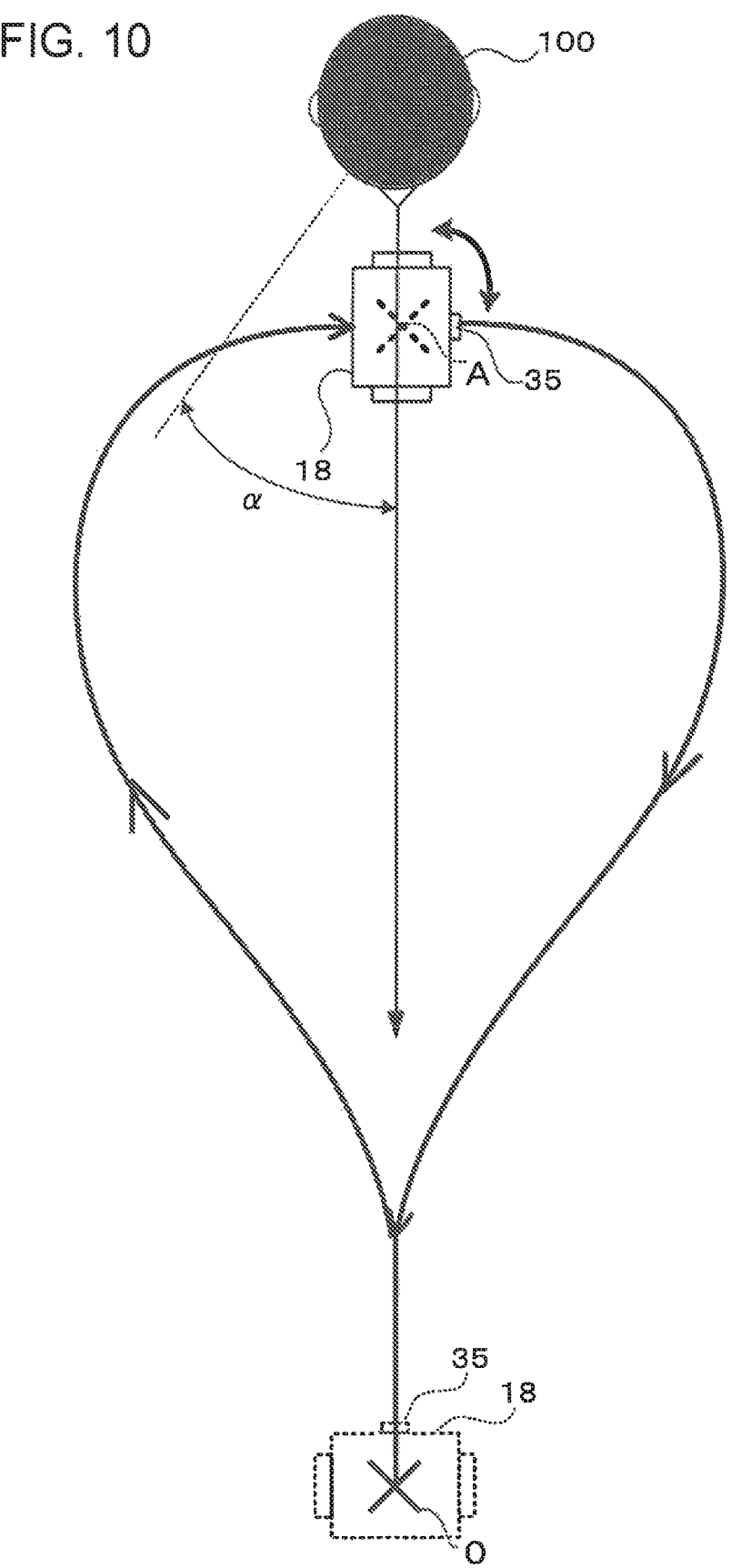
FIG. 10 is a diagram illustrating an example operation of the image forming apparatus according to an exemplary embodiment of the present invention.

FIG. 8 to FIG. 10 illustrate operations of the image forming apparatus 18 in a case where, for example, the image forming apparatus 18 moves from a start point 0 to a destination point A, that is, the desk of a user 100, which is a person, and the sensor 35 detects the presence of the user 100 around the destination point A.

First, when the sensor 35 detects the presence of the user 100 around the destination point A, the image forming apparatus 18 determines a route on the basis of the position relationship between the shortest route and the user 100. Then, the image forming apparatus 18 moves along a travel route received from the server 12, which is the shortest route, until the image forming apparatus 18 approaches a point that is a preset distance from the destination point. When the image forming apparatus 18 approaches the point that is the preset distance from the destination point, the image forming apparatus 18 moves along a route other than the shortest route without traveling along the shortest route even in a case where there is no obstacle and approaches the destination point A while decreasing the approach speed.

Examples of a route other than the shortest route include a circuitous route that is longer than the shortest route by a predetermined length from a point around the preset distance from the destination point, and a route that extends to the destination point at a predetermined angle or more from a direction in which the face of the user 100 is facing, the direction being detected by the sensor 35, from a point around the preset distance from the destination point.

In a case where the face and the line of sight of the user 100 are recognized by using the sensor 35 and the image forming apparatus 18 is within the visual field estimated by the estimation unit 55, the image forming apparatus 18 determines a route on the basis of the position relationship between the shortest route and the user 100. Specifically, as illustrated in FIG. 8, the image forming apparatus 18 moves along the travel route received from the server 12, which is the shortest route, until the image forming apparatus 18 approaches a point that is a preset distance from the destination point A. When the image forming apparatus 18 approaches the point that is the preset distance from the destination point A, the image forming apparatus 18 travels along a curved route toward an end of the right side or the left side of the visual field of the user 100 without traveling straight along the travel route, and approaches the destination point A from the side or diagonally from the front of the visual field of the user 100, that is, at an angle at which the image forming apparatus 18 is unlikely to come into the visual field of the user 100, while decreasing the approach speed. After arriving at the destination point A, the image forming apparatus 18 rotates at the point so as to face in a direction convenient for the user 100, and outputs the print job in response to reception of information, such as the user ID and password, input into the input unit 44. On the way back, the image forming apparatus 18 travels along a curved route up to the point that is the preset distance from the destination point A without turning back along the same route on the way to the destination point A. From the point that is the preset distance from the destination point A, the image forming apparatus 18 returns to the original position along the travel route received from the server 12, which is the shortest route, while increasing the speed.

Further, as illustrated in FIG. 9, the image forming apparatus 18 moves along the travel route received from the server 12, which is the shortest route, until the image forming apparatus 18 approaches a point that is a preset distance from the destination point A. When the image forming apparatus 18 approaches the point that is the preset distance from the destination point A, the image forming apparatus 18 travels along a curved route toward an end of the right side or the left side of the visual field of the user 100 without traveling straight along the travel route, and approaches the destination point A from the side or diagonally from the front of the visual field of the user 100, that is, at an angle at which the image forming apparatus 18 almost goes out of the visual field of the user 100, while decreasing the approach speed. After arriving at the destination point A, the image forming apparatus 18 rotates at the point so as to face in a direction convenient for the user 100, and outputs the print job in response to reception of information, such as the user ID and password, input into the input unit 44. On the way back, the image forming apparatus 18 takes a curved route up to the point that is the preset distance from the destination point A without turning back along the same route on the way to the destination point A. From the point that is the preset distance from the destination point A, the image forming apparatus 18 returns to the original position along the travel route received from the server 12, which is the shortest route, while increasing the speed.

Further, as illustrated in FIG. 10, the image forming apparatus 18 moves along the travel route received from the server 12, which is the shortest route, until the image forming apparatus 18 approaches a point that is a preset distance from the destination point A. When approaching the point that is the preset distance from the destination point A, the image forming apparatus 18 recognizes the face of the person by using the sensor 35, for example. In a case where the image forming apparatus 18 fails to recognize the visual field, the image forming apparatus 18 approaches the destination point A at a predetermined angle α or more from a direction in which the face of the user 100 is facing without traveling straight along the travel route while decreasing the approach speed. After arriving at the destination point A, the image forming apparatus 18 rotates at the point so as to face in a direction convenient for the user 100, and outputs the print job in response to reception of information, such as the user ID and password, input into the input unit 44. On the way back, the image forming apparatus 18 takes a curved route up to the point that is the preset distance from the destination point A without turning back along the same route on the way to the destination point A. From the point that is the preset distance from the destination point A, the image forming apparatus 18 returns to the original position along the travel route received from the server 12, which is the shortest route, while increasing the speed.

Here, "an angle at which the image forming apparatus 18 is unlikely to come into the visual field" refers to an angle that is outside the visual field and, for example, that is larger than 120 degrees or so, which is the lateral angle of the human binocular visual field. Further, "an angle at which the image forming apparatus 18 almost goes out of the visual field" refers to an angle that is within the visual field, that is inside the visual field and close to the outside thereof, and, for example, that is smaller than and close to 120 degrees or so, which is the lateral angle of the human binocular visual field.

Figure 11:
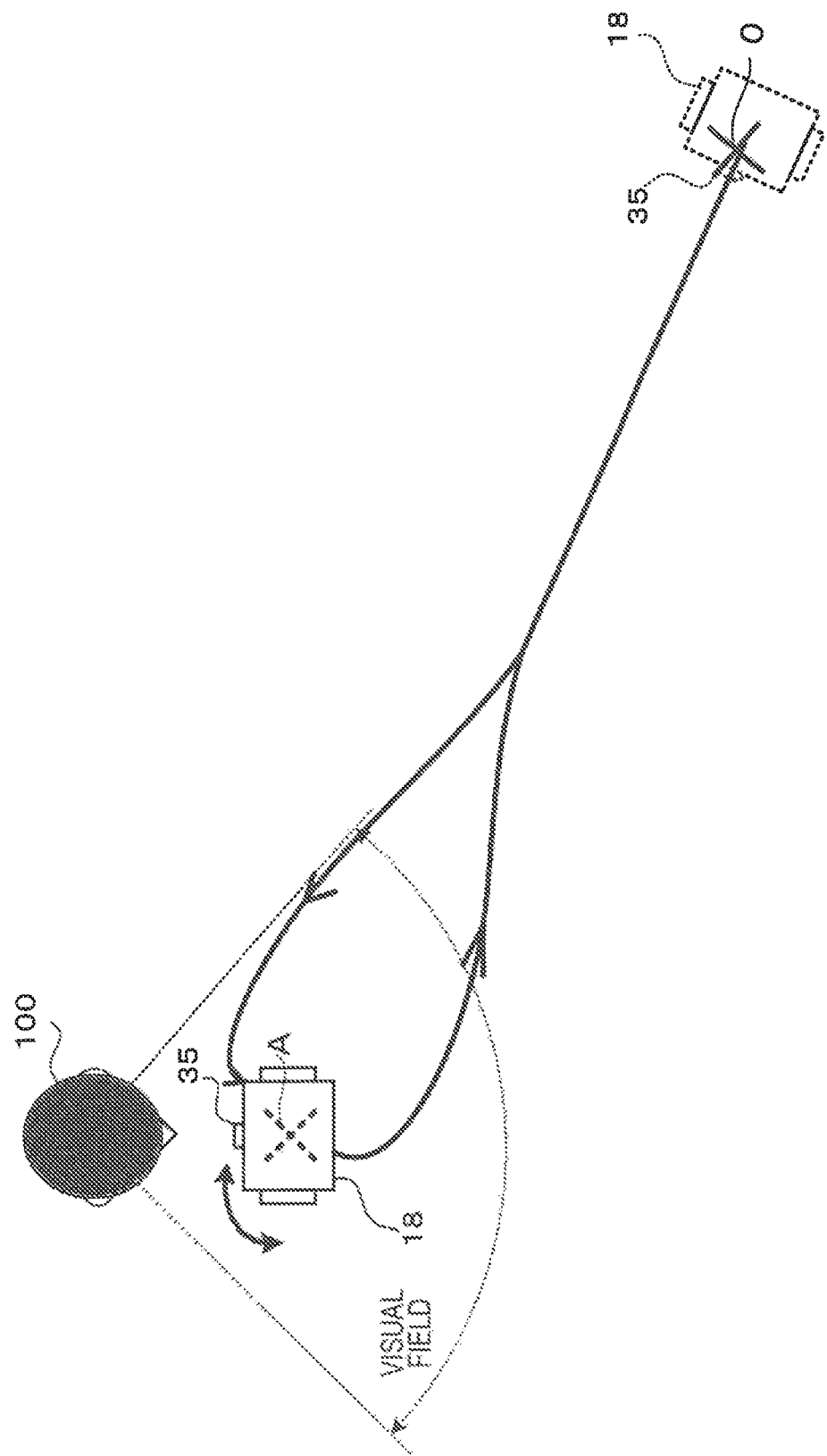
FIG. 11 is a diagram illustrating an example operation of the image forming apparatus according to an exemplary embodiment of the present invention.

In a case where the face and the line of sight of the user 100 are recognized by using the sensor 35, and the image forming apparatus 18 is not within the visual field of the user 100 estimated by the estimation unit 55, a route is determined on the basis of the position relationship between the shortest route and the user 100. Here, in a case where the start point, the destination point, and the user are not aligned, a route that is not circuitous is selected. Specifically, as illustrated in FIG. 11, the image forming apparatus 18 moves along the travel route received from the server 12, which is the shortest route, until the image forming apparatus 18 approaches a point that is a preset distance from the destination point A. When the image forming apparatus 18 approaches the point that is the preset distance from the destination point A and comes into the visual field of the user 100, the image forming apparatus 18 travels along a curved route toward an end of the visual field closer to the user 100 without traveling straight along the travel route, and approaches the destination point A from the side or diagonally from the front of the visual field of the user 100, that is, at an angle at which the image forming apparatus 18 almost goes out of the visual field of the user 100, while decreasing the approach speed. After arriving at the destination point A, the image forming apparatus 18 rotates at the point so as to face in a direction convenient for the user 100, and outputs the print job in response to reception of information, such as the user ID and password, input into the input unit 44. On the way back, the image forming apparatus 18 takes a curved route up to the point that is the preset distance from the destination point A without turning back along the same route on the way to the destination point A. From the point that is the preset distance from the destination point A, the image forming apparatus 18 returns to the original position along the travel route received from the server 12, which is the shortest route, while increasing the speed.

In the above-described exemplary embodiment, the configuration is described in which, on the way back, the image forming apparatus 18 takes a curved route without turning back along the same route on the way to the destination point A and, from the point that is the preset distance from the destination point A, returns to the original position along the shortest route. However, the exemplary embodiment of the present invention is not limited to this. On the way back, the image forming apparatus 18 may return to the original position along the same route on the way to the destination point A or may return to the original position along the shortest route without taking a curved route after outputting the print job.

Figure 12:
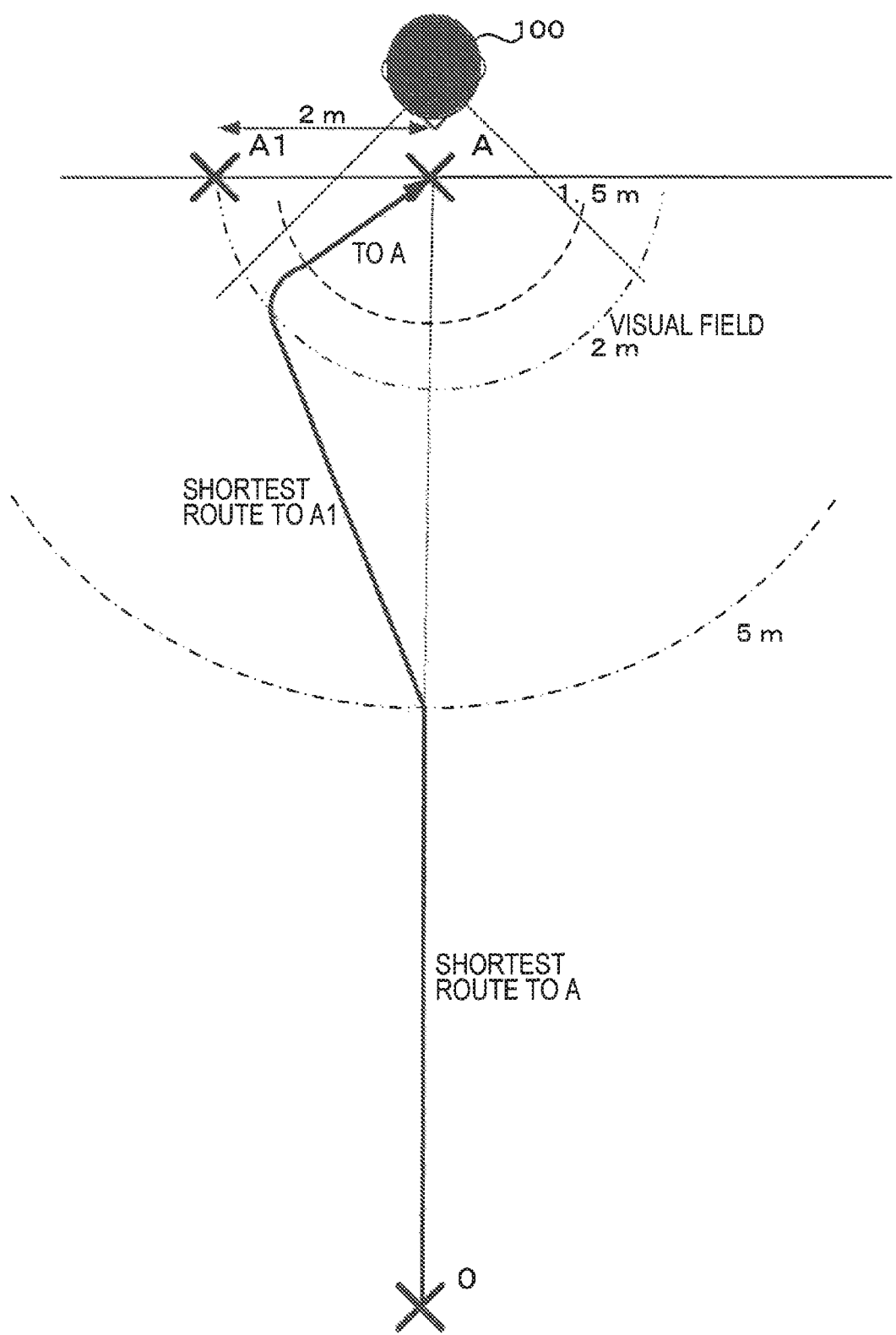
FIG. 12 is a diagram illustrating an example operation of the image forming apparatus according to an exemplary embodiment of the present invention.

FIG. 12 is a diagram illustrating an operation of the image forming apparatus 18 according to a first modification in a case where the sensor 35 detects the presence of the user 100 around the destination point A when the image forming apparatus 18 moves from the start point 0 to the destination point A, which is described below.

In a case where the face and the line of sight of the user 100 are recognized by using the sensor 35, and the image forming apparatus 18 is within the visual field estimated by the estimation unit 55, the image forming apparatus 18 moves along the travel route received from the server 12, which is the shortest route, in an area sufficiently (for example, 5 m or more) distant from the destination point A, as illustrated in FIG. 12. When the image forming apparatus 18 approaches a point that is a preset distance (for example, 5 m or so) from the destination point A, the image forming apparatus 18 sets a point that is in the vicinity of the destination point A, is located to the left or to the right of the destination point A, and is, for example, approximately 2 m distant from the destination point A as a provisional target point A1. Here, determination as to whether a point that is located to the left or to the right of the destination point is set as a provisional target point is performed such that an obstacle around the destination point is detected by the sensor 35, and a point in a direction in which no obstacle is present is set as the provisional target point A1. Then, the image forming apparatus 18 moves along the shortest route to the provisional target point A1 up to a point, for example, approximately 2 m distant from the destination point A. When the image forming apparatus 18 approaches the point approximately 2 m distant from the destination point A, the image forming apparatus 18 resets the target point from the provisional target point A1 to the destination point A. At this time, the image forming apparatus 18 sets the target point to the destination point A while moving along a curved route along an edge of the visual field at a decreased approach speed. When the image forming apparatus 18 approaches a preset area that is, for example, approximately 1.5 m distant from the destination point A, the image forming apparatus 18 moves along the shortest route to the destination point A, and approaches the user 100 in a diagonal direction of the user 100 at an angle at which the image forming apparatus 18 almost goes out of the visual field of the user 100, that is, at an angle approximately 45 degrees from a route that is taken in a case where the image forming apparatus 18 approaches the user 100 present around the destination point A straight from the start point 0.

In a case where an obstacle is detected on the travel route, the travel route is adjusted by decreasing the distance between the provisional target point A1 and the destination point A to, for example, approximately 50 cm or by increasing a distance within which the image forming apparatus 18 changes the target point from the provisional target point A1 to the destination point A while moving.

Figure 13:
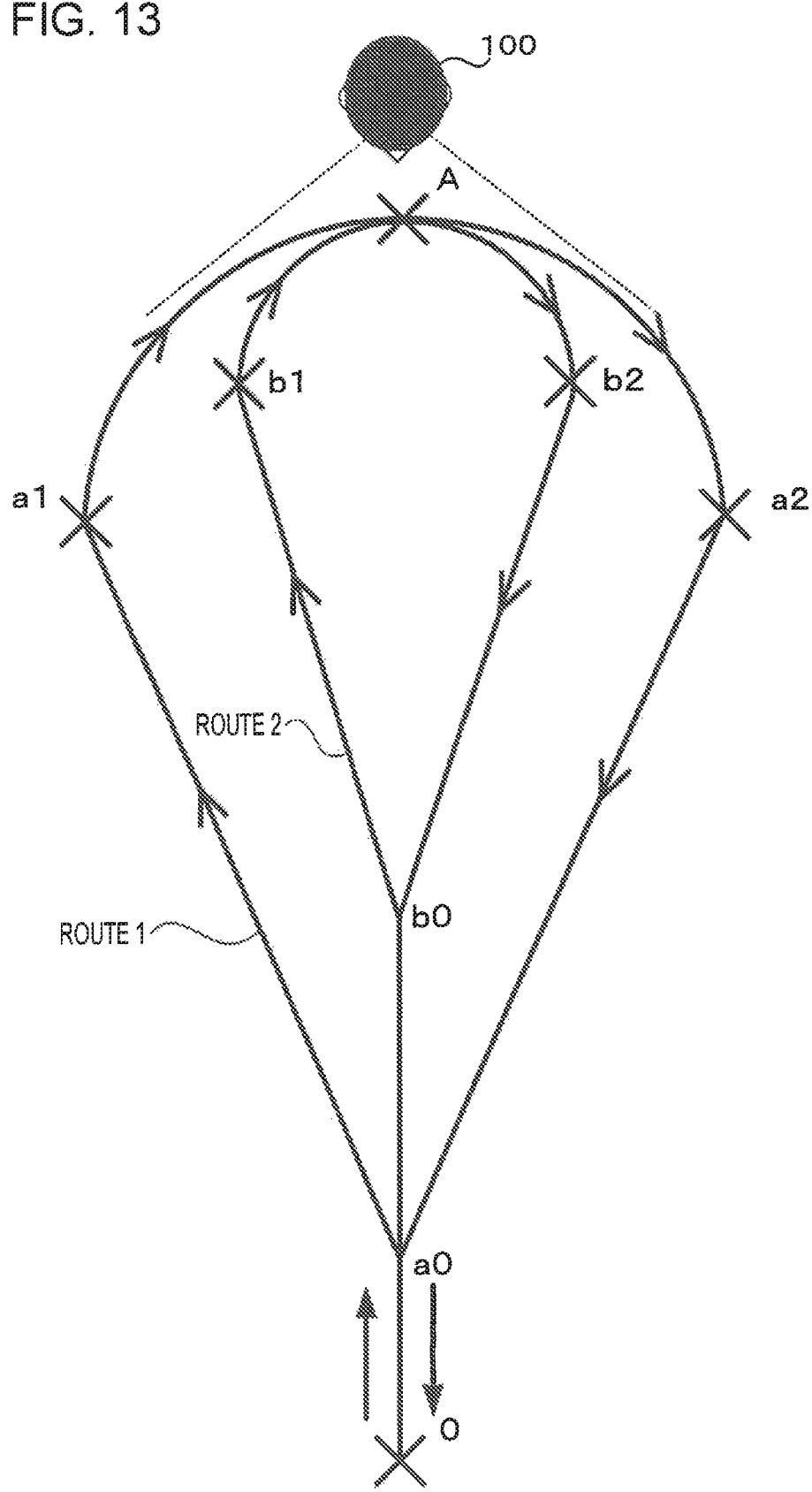
FIG. 13 is a diagram illustrating an example operation of the image forming apparatus according to an exemplary embodiment of the present invention.

FIG. 13 is a diagram illustrating an operation of the image forming apparatus 18 according to a second modification in a case where the sensor 35 detects the presence of the user 100 around the destination point A when the image forming apparatus 18 moves from the start point 0 to the destination point A, and the image forming apparatus 18 is within the visual field of the user 100, which is described below. In the second modification, a route 1 taken in a case where no obstacle is present in the vicinity of the destination point A and a route 2 taken in a case where an obstacle is present in the vicinity of the destination point A are described.

In the case where no obstacle is present in the vicinity of the destination point A, the image forming apparatus 18 moves from the start point 0 up to a point a0, which is a point that is a preset distance from the destination point A, along the travel route received from the server 12, which is the shortest route, as illustrated in FIG. 13. Then, the image forming apparatus 18 moves straight from the point a0 to an end point a1 of a virtual semicircle a1-a2 that includes the destination point A. Thereafter, the image forming apparatus 18 moves from the end point a1 to the destination point A along the virtual semicircle a1-a2 while decreasing the approach speed. That is, in the vicinity of the user 100 present around the destination point A, the image forming apparatus 18 moves along a semicircular route at an angle at which the image forming apparatus 18 almost goes out of the visual field of the user 100. On the way back, the image forming apparatus 18 moves from the destination point A to an end point a2 of the virtual semicircle a1-a2 along a semicircular route, moves from the end point a2 to the point a0 at an increased speed, and moves straight from the point a0 to the point 0.

In a case where the presence of an obstacle in the vicinity of the destination point A is detected, and the image forming apparatus 18 may come into contact with the obstacle if the route 1 described above is taken, a virtual semicircle b1-b2 that includes the destination point A and that has a radius smaller than that of the virtual semicircle a1-a2 is used as the route. Specifically, the image forming apparatus 18 moves from the start point 0 up to a point b0, which is closer to the destination point A than the point a0 and which is a point that is a preset distance from the destination point A, along the travel route received from the server 12, which is the shortest route. Then, the image forming apparatus 18 moves straight from the point b0 to an end point b1 of the virtual semicircle b1-b2 that includes the destination point A. Thereafter, the image forming apparatus 18 moves from the end point b1 to the destination point A along the virtual semicircle b1-b2 while decreasing the approach speed. That is, in the vicinity of the user 100 present around the destination point A, the image forming apparatus 18 moves along a semicircular route at an angle at which the image forming apparatus 18 almost goes out of the visual field of the user 100. On the way back, the image forming apparatus 18 moves from the destination point A to an end point b2 of the virtual semicircle b1-b2 along a semicircular route, moves from the end point b2 to the point b0 at an increased speed, and moves straight from the point b0 to the point 0.

Figure 14:
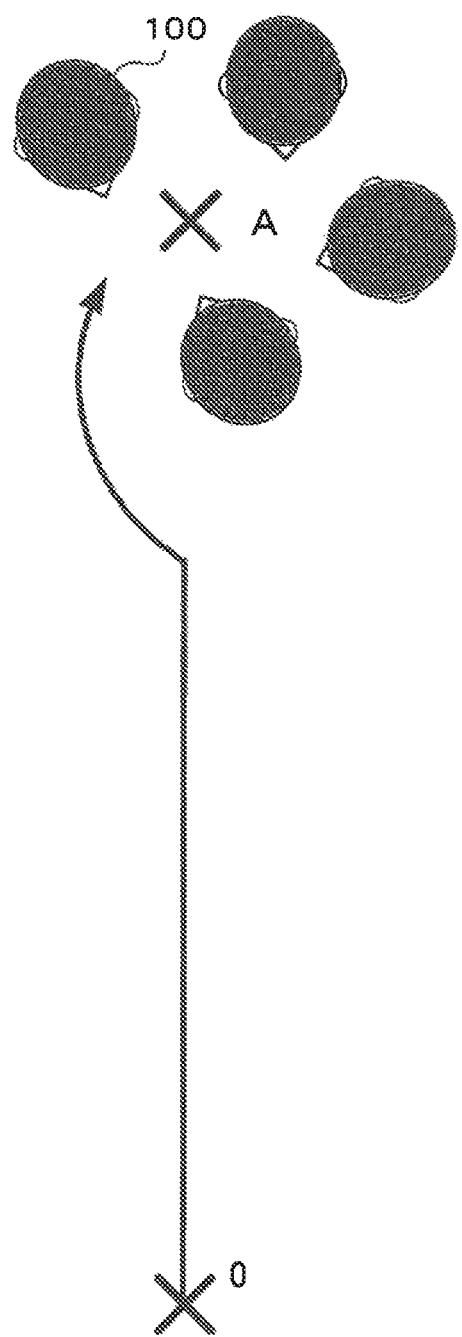
FIG. 14 is a diagram illustrating an example operation of the image forming apparatus according to an exemplary embodiment of the present invention.

FIG. 14 is a diagram illustrating a route taken in a case where plural persons including the user 100 are present around the destination point A.

In a case where the sensor 35 detects the presence of plural persons around the destination point A, the estimation unit 55 infers on which side of the destination point each of the plural persons is present, how the persons are located, whether the persons are facing each other, whether the persons are located side-by-side, or whether the persons are facing in different directions on the basis of information about the contours, the face, the line of sight, and so on of each of the persons recognized by the person recognition unit 52, the face recognition unit 53, and the line-of-sight recognition unit 54. The image forming apparatus 18 approaches the destination point A in a direction in which a smaller number of persons are present.

In a case where an obstacle is present in the middle of the route taken and the travel route is automatically generated so as to move around the obstacle or in a case where the travel route is reset in response to detection of an obstacle coming into the route, the travel route is set in a similar manner as described above.

Figure 15:
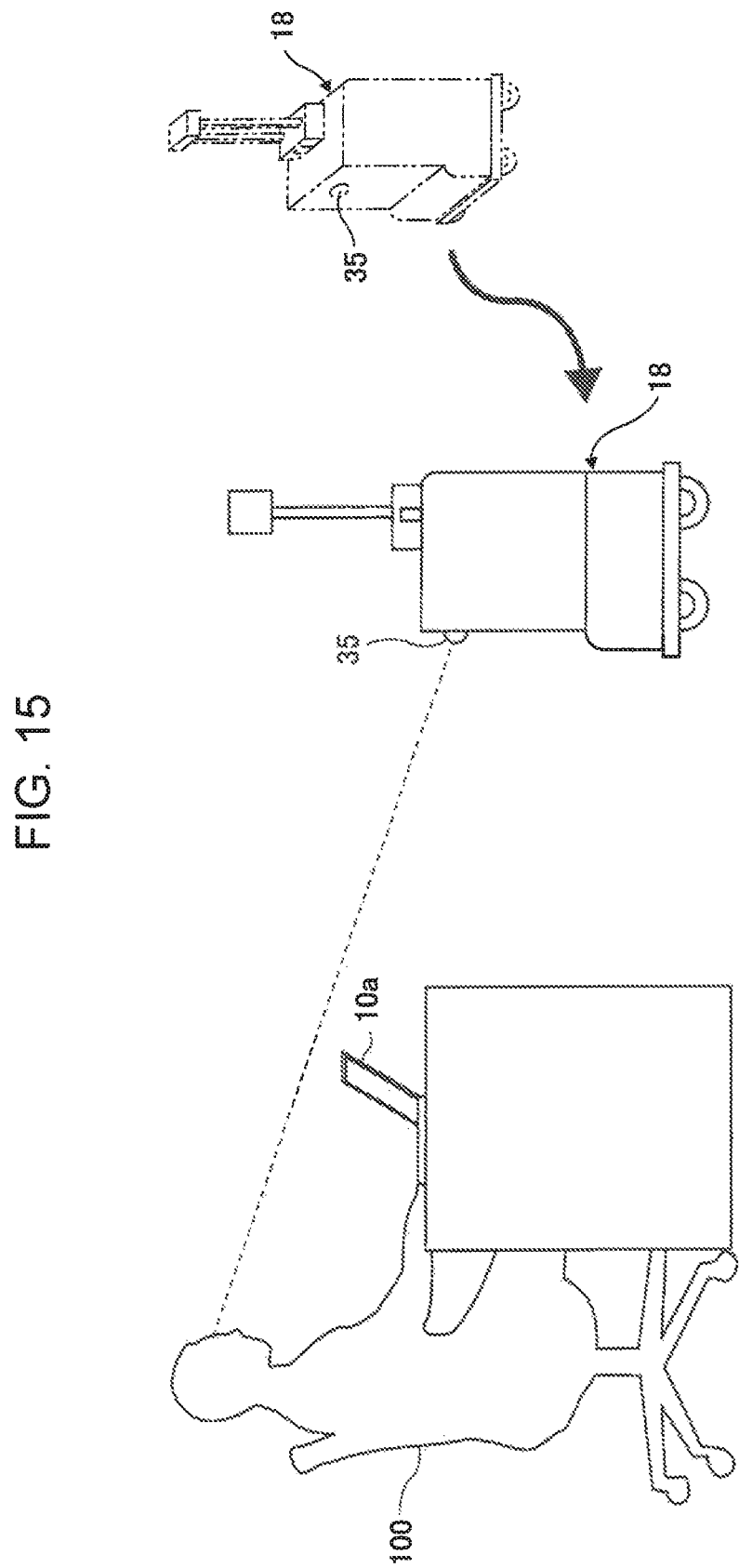
FIG. 15 is a diagram illustrating an example operation of the image forming apparatus according to an exemplary embodiment of the present invention.
Figure 16A:
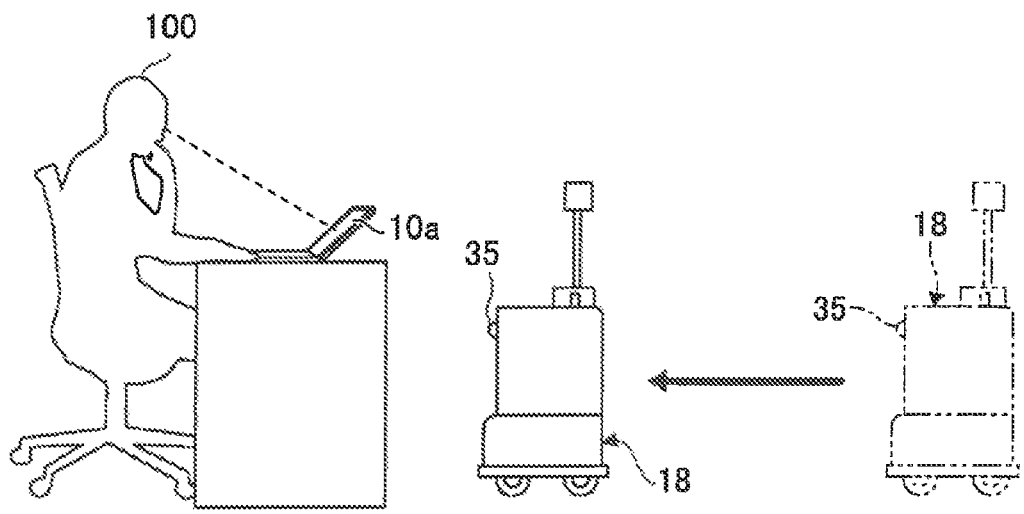
FIGS. 16A and 16B are diagrams illustrating example operations of the image forming apparatus according to an exemplary embodiment of the present invention.
Figure 16B:
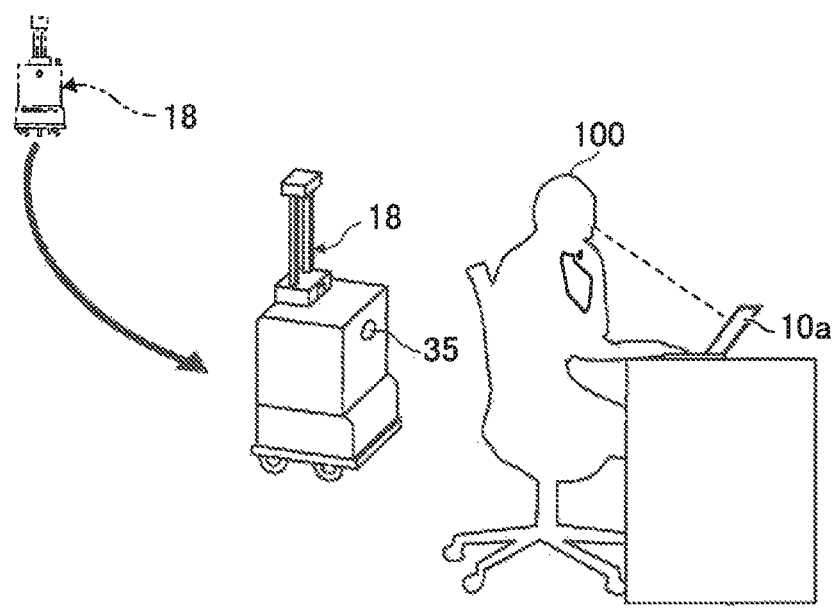

FIG. 15 is a diagram illustrating a case where the user 100 is sitting in the vicinity of the installation position of the PC 10a, which is the destination point, and is tuning their eyes in a direction toward the image forming apparatus 18. FIGS. 16A and 16B are diagrams illustrating cases where the user 100 is sitting in the vicinity of the installation position of the PC 10a, which is the destination point, and is not tuning their eyes in a direction toward the image forming apparatus 18.

In the state where the user is turning their eyes to the image forming apparatus 18, as illustrated in FIG. 15, the estimation unit 55 infers that the user 100 is sitting and looking at the image forming apparatus 18 on the basis of information about the contours, the face, the line of sight, and so on of the user 100 present around the destination point. The image forming apparatus 18 uses the shortest route within a preset area, and thereafter, approaches the destination point along a curved route or diagonally from the front of the user 100 while decreasing the approach speed. In the state where the user is not turning their eyes to the image forming apparatus 18, as illustrated in FIGS. 16A and 16B, the estimation unit 55 infers that the user 100 is sitting, looking down, and working on the basis of information about the contours, the face, the line of sight, and so on of the user 100 present around the destination point A. Then, the image forming apparatus 18 may switch a setting. Specifically, the image forming apparatus 18 may, for example, move along the shortest route at an angle at which the image forming apparatus 18 is likely to come into the visual field of the user 100 and approach the user 100 so that the image forming apparatus 18 is noticed by the user 100, as illustrated in FIG. 16A. Alternatively, the image forming apparatus 18 may move behind the user 100 and approach the user 100 diagonally from the back of the user 100 so that the image forming apparatus 18 is not noticed by the user 100, as illustrated in FIG. 16B.

That is, there may be a case where it is desirable to make the image forming apparatus 18 be noticed by a person present around the destination point and a case where it is desirable to make the image forming apparatus 18 be unnoticed by a person present around the destination point depending on the state of the person present around the destination point. Therefore, an approach method is made selectable by selecting a mode.

For example, in a case where the line of sight is successfully recognized by the line-of-sight recognition unit 54, it is possible to select an approach method. Specifically, it is possible to switch between a mode in which the image forming apparatus 18 approaches the user 100 along a curved route or diagonally from the front of the user 100 in a case where it is recognized that the user 100 is gazing at the image forming apparatus 18 and a mode in which the image forming apparatus 18 approaches straight to the user 100 in a case where it is recognized that the user 100 is not gazing at the image forming apparatus 18. Alternatively, the approach method may be flipped. That is, it is possible to switch the setting between a mode in which the image forming apparatus 18 approaches straight to the user 100 in the case where it is recognized that the user 100 is gazing at the image forming apparatus 18 and a mode in which the image forming apparatus 18 approaches the user 100 along a curved route or diagonally from the front of the user 100 in the case where it is recognized that the user 100 is not gazing at the image forming apparatus 18.

Further, it is possible to switch the setting between a mode in which the image forming apparatus 18 approaches the user 100 diagonally from the back of the user 100 in a case where it is desirable to make the image forming apparatus 18 not bother the user 100 and a mode in which the image forming apparatus 18 approaches the user 100 diagonally from the front of the user 100 in a case where it is desirable to make the user 100 notice that the image forming apparatus 18 is approaching.

Further, it is possible to switch the approach method of the image forming apparatus 18 in accordance with the environment of the installation site, the characteristics of the users, the time period, and so on. For example, it is possible to use an approach method in which the image forming apparatus 18 moves along the shortest route in a case where most of the persons are familiar with the service as described above and put priority on efficiency or an approach method that takes into consideration the impression received by the users in a case where various users are present and it is desirable to improve the service quality and to put priority on the impression received by the users.

In the above-described exemplary embodiment, the example is described in which a map of the office 58 and so on and information about the installation positions of the PCs 10a to 10d are stored in the database 26 of the server 12, and a travel route is searched for; however, the exemplary embodiment of the present invention is not limited to this. The image forming apparatus 18 may be controlled so as to search for a travel route on the basis of a map of the office 58 and so on and information about the installation positions of the PCs 10a to 10d stored in the storage device 45 and moves from the start point to the destination point.

In the above-described exemplary embodiment, the image forming apparatus 18 is configured to move to any of the locations where the PCs 10a to 10d are installed; however, the exemplary embodiment of the present invention is not limited to this. The image forming apparatus 18 may be configured to move to a location specified by a user or to a location where a position transmitter carried by a user is present.

In the above-described exemplary embodiment, the image forming apparatus 18 is described as an example of the autonomous mobile robot; however, the autonomous mobile robot is not limited to this and may be any robot that enables autonomous movement. The exemplary embodiment of the present invention is applicable to a wide variety of usage scenarios, such as conveyance of business machines, delivery of drinks, mails, and so on, and telepresence using cameras, microphones, display screens, and speakers, for example.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An autonomous mobile robot comprising:
   a robot body;
   a movement unit that moves the robot body to a destination point;
   a detector that (i) includes an estimation unit that estimates a visual field from a line of sight of a person present around the destination point; and (ii) detects a state of the person present around the destination point, including determining a direction the person is facing; and
   a controller that controls the movement unit, and the controller is programmed so that, in a case in which the destination point is within the visual field of the person estimated by the estimation unit and the robot body is within the visual field of the person, the controller makes the robot body move along a travel route to the destination point such that (i) the robot body moves along a first route from a start point to a first point located between the start point and the destination point, (ii) the robot body moves from the first point to the destination point along a second route having a direction that is different from a direction of the first route, wherein the controller is programmed to determine the second route based on the determined direction the person is facing to make the robot body (i) approach the destination point at a predetermined angle or more from the direction the person is facing and (ii) approach the person at an angle at which the robot body moves along an edge of, but still within, the visual field.

2. The autonomous mobile robot according to claim 1, wherein
the direction the person is facing is detected by the detector in a vicinity of the destination point.

3. The autonomous mobile robot according to claim 1, wherein
the controller controls the movement unit so as to, after the robot body moves to the first point, make the robot body approach the person present around the destination point in such a manner as to make the robot body move to a provisional target point and move from the provisional target point to the destination point, which is reset as a target point, the provisional target point being a point that is set in a vicinity of the destination point, is located to the left or to the right of the visual field of the person present around the destination point estimated by the estimation unit, and is distant from the visual field.

4. The autonomous mobile robot according to claim 1, wherein
the controller controls the movement unit so as to make the robot body approach the person present around the destination point while controlling an approach speed in accordance with the state of the person detected by the detector.

5. The autonomous mobile robot according to claim 2, wherein
the controller controls the movement unit so as to make the robot body approach the person present around the destination point while controlling an approach speed in accordance with the state of the person detected by the detector.

6. The autonomous mobile robot according to claim 3, wherein
the controller controls the movement unit so as to make the robot body approach the person present around the destination point while controlling an approach speed in accordance with the state of the person detected by the detector.

7. The autonomous mobile robot according to claim 1, wherein the autonomous mobile robot includes an image forming apparatus.

8. The autonomous mobile robot according to claim 1, wherein the first route is the detected shortest route from the start point to the destination point, and the second route is not the shortest route even in a case where no obstacle is present.

9. The autonomous mobile robot according to claim 1, wherein the second route includes a curved route.

10. The autonomous mobile robot according to claim 1, wherein the second route includes a curved route and a straight route.

* * * * *